(12) United States Patent
Oare et al.

(10) Patent No.: US 6,634,397 B1
(45) Date of Patent: Oct. 21, 2003

(54) TIRE HAVING FLOATING REINFORCEMENT IN THE SHOULDER/SIDEWALL

(75) Inventors: Thomas Reed Oare, Suffield, OH (US); Melissa Marie Beauvais, Cuyahoga Falls, OH (US); Jennifer Ann McDougal, Cuyahoga Falls, OH (US); Robert Allen Losey, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/381,028

(22) PCT Filed: Apr. 28, 1997

(86) PCT No.: PCT/US97/07097

§ 371 (c)(1),
(2), (4) Date: Sep. 10, 1999

(87) PCT Pub. No.: WO98/49020

PCT Pub. Date: Nov. 5, 1998

(51) Int. Cl.$^7$ .............. B60C 13/00; B60C 9/18; B60C 9/00
(52) U.S. Cl. ........... 152/526; 152/458; 152/532; 152/549; 152/555; 152/556
(58) Field of Search ................. 152/549, 458, 152/525, 555, 556, 541, 537, 532, 526, 548; 156/123

(56) References Cited

U.S. PATENT DOCUMENTS

| | | | | |
|---|---|---|---|---|
| 4,120,339 A | * | 10/1978 | Shichman | ............ 152/526 |
| 5,360,047 A | * | 11/1994 | Fujiwara | ............ 152/454 |
| 5,361,820 A | | 11/1994 | Adachi | |
| 5,709,760 A | * | 1/1998 | Prakash | ............ 152/556 |
| 5,746,853 A | * | 5/1998 | Burlacot | ............ 152/531 |
| 5,779,829 A | * | 7/1998 | Prakash | ............ 152/540 |

FOREIGN PATENT DOCUMENTS

| | | | |
|---|---|---|---|
| EP | 0 536 615 A1 | | 4/1993 |
| EP | 0 613 795 B1 | * | 7/1994 |
| EP | 0 613 795 A | | 9/1994 |
| EP | 0 744 305 A2 | * | 11/1996 |
| FR | 2 429 681 A | | 1/1980 |
| GB | 2096949 | * | 4/1982 |
| GB | 2 096 949 A | | 10/1982 |
| JP | 06297907 | * | 10/1994 |
| JP | 61110602 | * | 5/1996 |

* cited by examiner

*Primary Examiner*—Michael W. Ball
*Assistant Examiner*—Justin Fischer
(74) *Attorney, Agent, or Firm*—Nancy T. Krawczyk; David E. Wheeler

(57) ABSTRACT

A radial ply tire (10) has a floating reinforcement ply on the inside shoulder/sidewall region of the tire. The reinforcement ply comprises ply rubber having a gauge sufficient to delocalize flexing in the tire shoulder/sidewall region, and in one embodiment may be reinforced with 0.50 to 6.0 phr fibers. Depending on the type of tire in which the reinforcement ply is used, the reinforcement has a total gauge of 0.005 inch to 0.175 inch (0.127 to 4.445 mm). When fiber is used in the illustrated embodiment, the fiber is oriented circumferentially in the tire.

6 Claims, 4 Drawing Sheets

TIRE HAVING FLOATING REINFORCEMENT IN THE SHOULDER/SIDEWALL

BACKGROUND OF THE INVENTION

The present invention relates to radial pneumatic tires.

As materials improve, it has been the trend in the tire industry to reduce the gauges of tire components and the amount of material used to make a tire. The reduction in the amount of material in a tire reduces its weight, its rolling resistance, and makes the tire run cooler. It has been found, however, that the gauge in all portions of a tire cannot be reduced as much as the gauge in some portions of the tire and still produce a tire that has the durability and other properties of prior art tires with thicker gauges.

One of the ways in which the amount of material used in a tire can be reduced is to eliminate one or more of multiple components. For example, if a carcass ply can be made strong enough, two carcass plies can be replaced with a single carcass ply. Monoply tires can be used in applications where two carcass plies previously were needed.

It has been found that in radial pneumatic tires for highway driving, one area of weakness in a monoply tire is the shoulder area bridging the sidewall and crown of the tire.

It is known in the art to use a ribbon of ply rubber, about 0.020 inch (0.508 mm) gauge, in the shoulder/sidewall region of a high performance tire, and a similar ribbon having a higher gauge is used in light truck tires.

Until the present invention, no steel monoply carcass high performance tires ever passed durability tests. The inventors have discovered that the durability of a light weight tire is increased significantly by a gum rubber ply having a specific gauge, or by a fiber loaded reinforcement ply, strategically placed in the construction of a tire.

SUMMARY OF THE INVENTION

The present invention is a tire that employs a floating reinforcement ply bridging the intersection of a sidewall and crown area of the carcass. The tire of the invention is a pneumatic tire comprising a radial ply carcass, a tread disposed radially outwardly of the crown region of the carcass, and a belt assembly including at least one belt ply interposed between the tread portion and the crown region in circumferential surrounding relation to the carcass. The floating reinforcement ply is made from elastomeric material and in a preferred embodiment a fiber reinforced elastomeric material. Reinforcement fibers in a fiber reinforced ply are selected from the group consisting of polyamides, polyalkylenes, polyesters, cellulosics, inorganic fibers, aromatic polyamides and mixtures thereof.

DETAILED DESCRIPTION OF THE INVENTION

Figure 1:
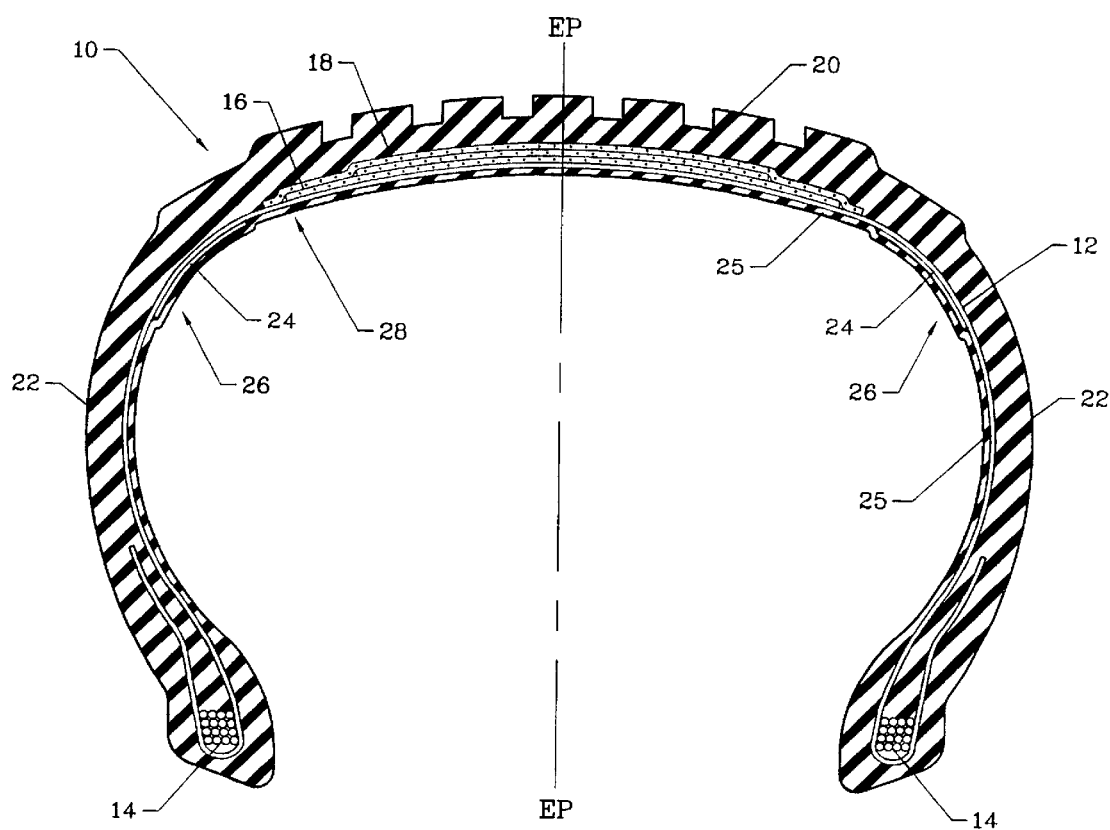
FIG. 1 is a cross-sectional view of a pneumatic tire made in accordance with the present invention.

With reference to FIG. 1, there is illustrated a radial carcass pneumatic tire 10 having a pair of substantially inextensible bead cores 14 which are axially spaced apart with a radial carcass ply 12 extending between the bead cores. The carcass ply is folded axially and radially outwardly about each of the bead cores and is reinforced by cords which are substantially parallel to each other and make an angle of about 65° to 90° with the equatorial plane (EP) of the tire. The cords of carcass ply 12 are made of steel.

Tread 20 is disposed radially outward of the carcass ply in the crown area of the tire and sidewalls 22 are disposed between the tread and beads. Belt assembly 16 is interposed between the tread and the carcass ply, the belt assembly having substantially the same width as the tread. In the illustrated embodiment, floating reinforcement ply 24 is disposed radially outward of carcass ply 12 in the shoulder area of the tire bridging sidewall area 26 and crown area 28 of carcass 12. When pneumatic tire 10 is a high performance tire, an overlay 18 is also used in the construction.

In prior attempts to develop high performance mono carcass ply steel reinforced tires, the tires never passed durability tests because of failures in the shoulder area of the tire. It is theorized by the inventors herein that such prior failure occurred because the consistency of green rubber during cure of a tire is reduced dramatically, i.e. the rubber acts in the same way as heated butter before it is cured, and the high modulus steel cords exhibit high stress in the shoulder area of the tire during expansion in the mold, which stretches and makes thin the inner liner and ply in this area of the tire. The ply may be reduced from a gauge of 0.050 inch to 0.040 inch (1.27 to 1.016 mm) in the expanded tire, and the end count of the reinforcement cords may be reduced about 25%, e.g. from 22 e.p.i. to 15 e.p.i. in the expanded tire. In a small percentage of tires, the ply reinforcement cords may cut through the liner in the mold. Also, in the cured tire, the thinner inner liner and ply permit the tire to flex in a smaller radius than would otherwise be possible, and the carcass cords may fatigue and possibly cut through the inner liner. By reinforcing this area of the tire it was believed that the extra reinforcement in the shoulder region would make the shoulder flex rounder, thus reducing fatigue, and would provide extra strength to reduce the possibility of the carcass cords cutting through the inner liner. In the latter regard, the addition of fibers to the reinforcement ply increases its green strength and helps prevent thinning of the liner and the ply in the shoulder region of the tire during curing in the mold, thus reducing the chances that the carcass cords will cut through the inner liner.

In the illustrated embodiment, the belt assembly includes two plies, each of which comprises cords of high modulus material extending parallel to one another in each belt ply and making opposed angles with respect to the equatorial plane of the tire.

Those skilled in the art will recognize that tires of the invention may comprise one to four belt plies.

As used herein, similar numbers may be used to identify similar portions of the invention in different drawings, but may be subscripted with letters to identify modifications.

"Radial" and "radially" refer to directions that are radially toward or away from the axis of rotation of the tire, and the term "floating" indicates no wraparound attachment to other components of the tire.

Floating reinforcement ply 24 has a total gauge of 0.005 to 0.175 inch (0.127 to 4.445 mm), preferably 0.010 to 0.150 inch (0.254 to 3.81 mm). In a preferred embodiment, the floating reinforcement ply is loaded with fiber reinforcement. The reinforcement fibers may comprise polyamides, polyalkylenes, polyesters, cellulosics, inorganic fiber, aromatic polyamides and mixtures thereof. Specifically the fibers may be selected from the group consisting of nylon, polyethylene terephthalate, polyethylene napthalate, aramid, glass, metal, rayon, polyethylene, polypropylene, cotton, or mixtures thereof.

Figure 2:
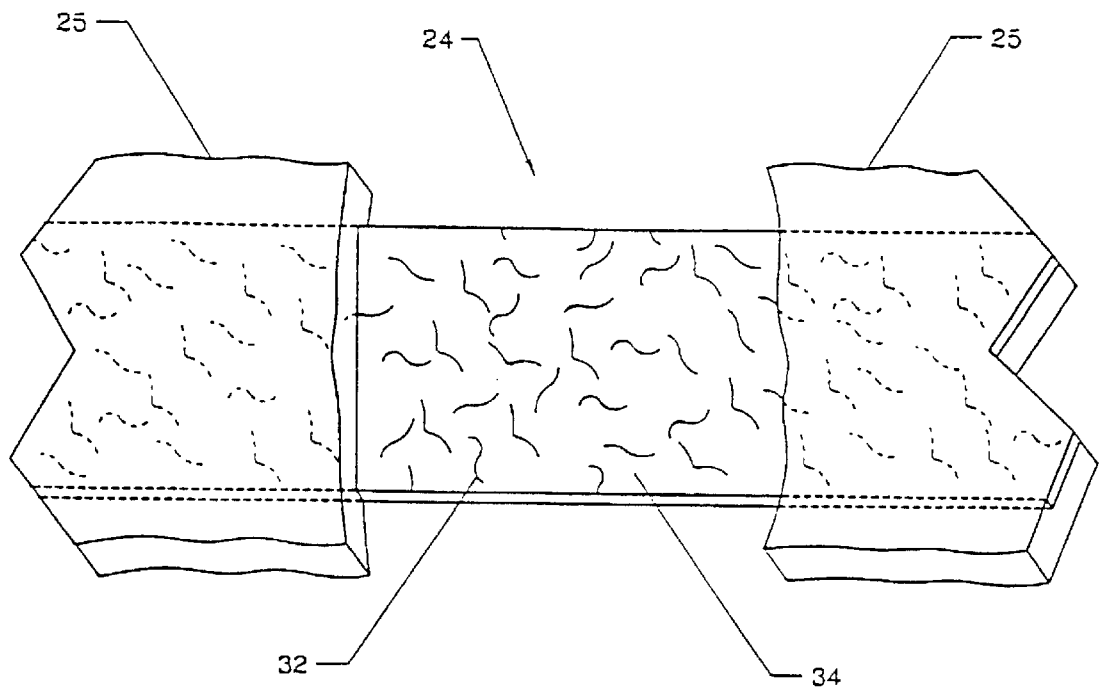
FIG. 2 shows one possible orientation of fibers in the reinforcement ply in a tire.
Figure 2A:
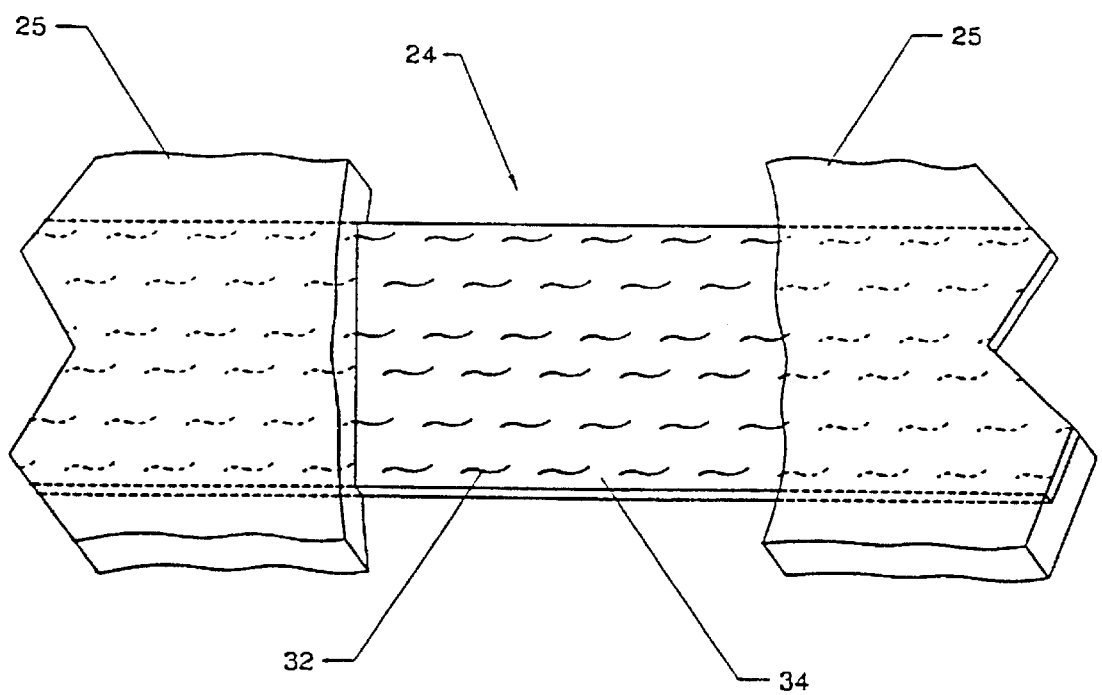
FIG. 2a shows a second possible orientation of fibers in the floating reinforcement ply in the tire.

Referring to FIGS. 2 and 2a, floating reinforcement ply 24 may be reinforced with 0.5 to 6 phr (parts by weight per hundred parts by weight rubber) fibers, preferably 1.5 to 4 phr fibers. In a high performance tire it is preferred that 1 to 2 phr fibers are used, and in the illustrated embodiment, 1.5 phr aramid pulp fibers are used. Because calendering causes the fibers to orient with the linear length direction of the ply, the fibers are oriented in the tire in the circumferential direction in the illustrated embodiment, see e.g. FIG. 2a. Those skilled in the art will recognize that other orientations of the fiber in the ply will work, e.g. radial orientation or axial orientation, and it is believed theoretically that random orientation will work best, see FIG. 2.

The aramid used in the illustrated embodiment was obtained from DuPont de Nemours Inc. in a master batch identified as Merge 6F722.

Figure 3:
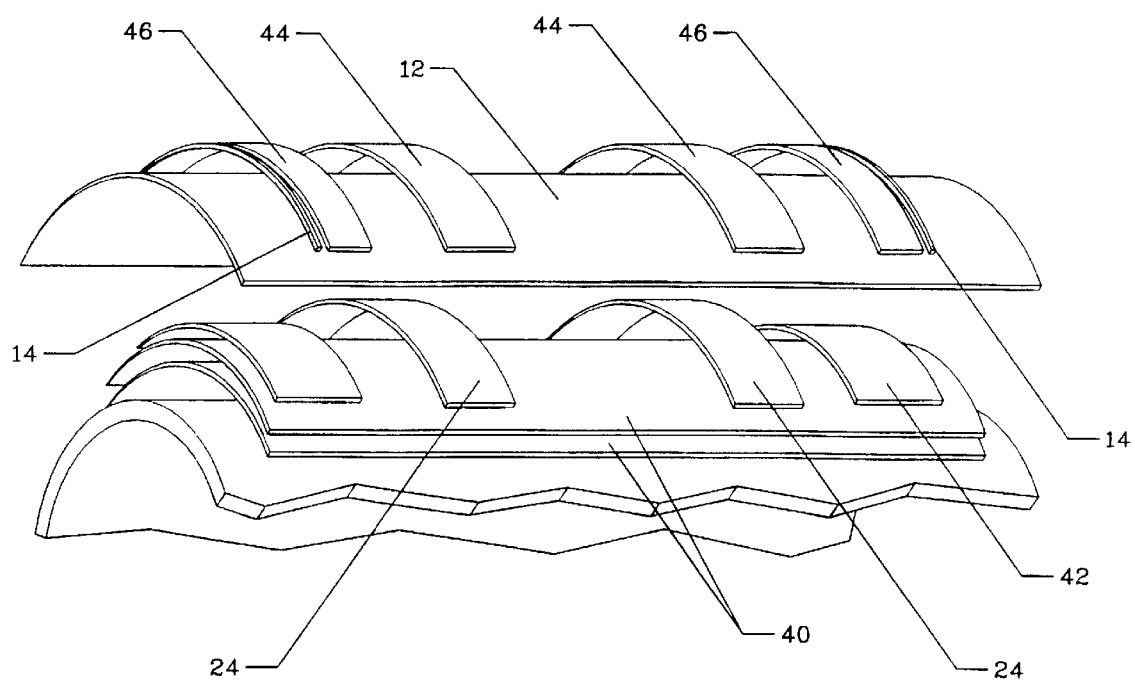
FIG. 3 illustrates one possible order of applying tire components to a tire building drum.

The floating reinforcement ply is 10 mm to 200 mm wide and may be applied to the building drum as one of the early components in the tire construction. With reference to FIG. 3, in the illustrated embodiment, two inner liners are applied to the building drum in the first step of the tire construction, followed by toe guards 42, floating reinforcement plies 24, carcass ply 12, and wedges 44. The beads 14 are then set into position followed by the addition of apex 46. The tire components are expanded and the edges of the carcass plies are turned up over the beads, followed by the addition of further tire components such as an optional chafer 48, and then sidewalls 22, belts 16, optional overlay 18 and tread 20.

Those skilled in this art will recognize that tire components can be added in a different order and different components can be used, depending on the kind of tire being built, for example some tires are made with one turn of inner liner. Those skilled in the art will also recognize that different placement of the floating reinforcement ply in the tire construction can be used, e.g., radially outward of the carcass plies, it being understood that such floating reinforcement plies will always be located in the shoulder of the tire bridging the sidewall/crown region of the tire.

Figure 4:
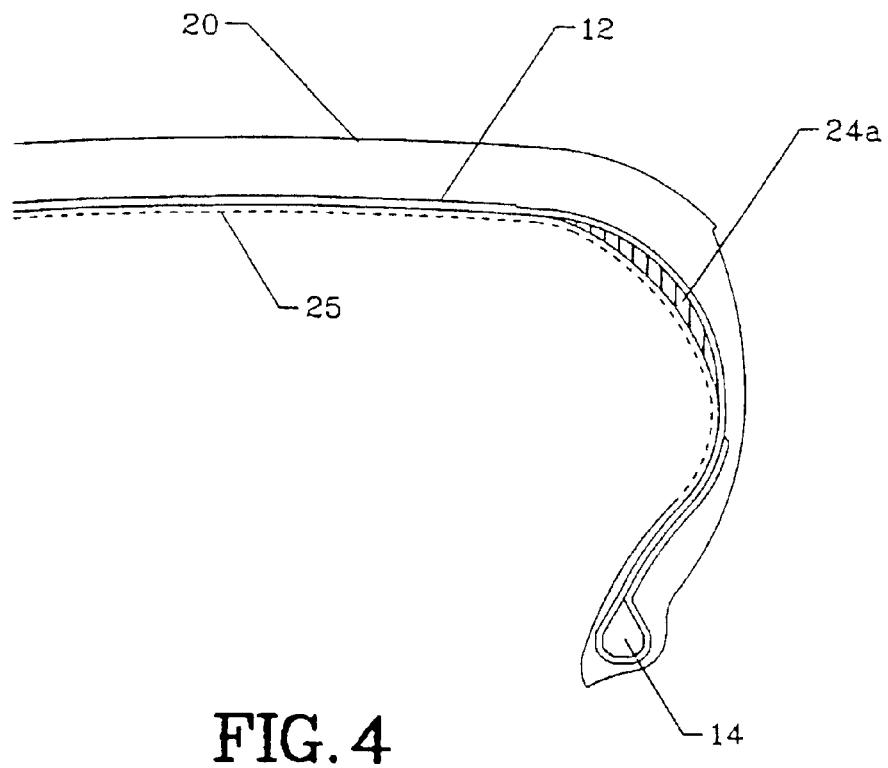
FIG. 4 illustrates an alternative embodiment of a floating ply in a low (0.4) aspect ratio tire.

With reference now to FIG. 4, in one embodiment, floating reinforcement ply, 24a may be shaped like a crescent, i.e. tapered at both edges.

Figure 5:
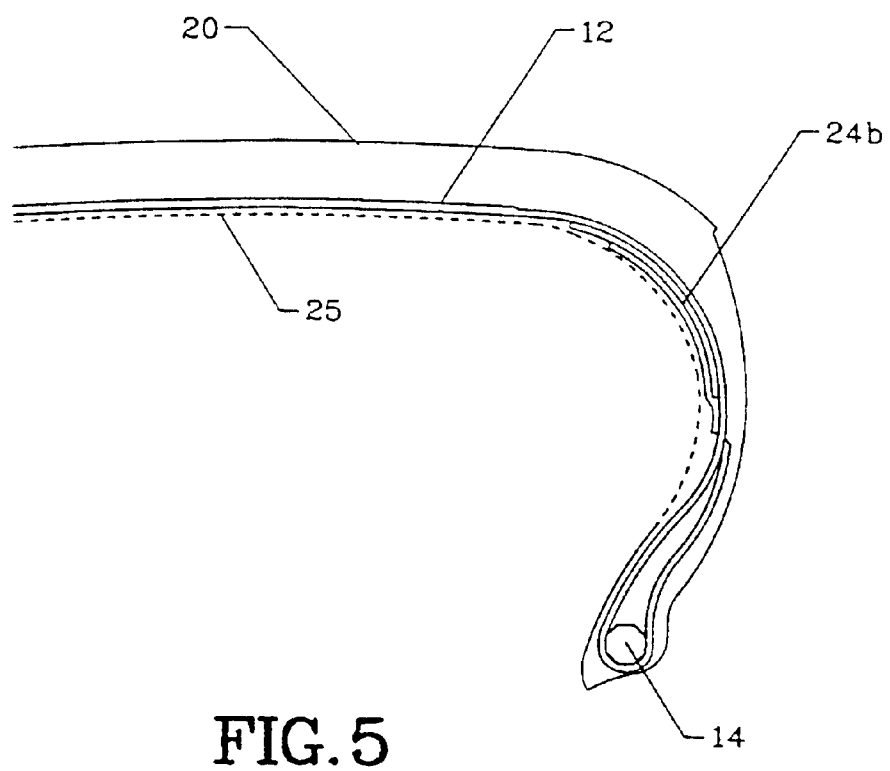
FIG. 5 illustrates a second alternative embodiment of a floating ply in a low (0.4) aspect ratio tire.

In an alternative embodiment, with reference to FIG. 5, the floating ply may comprise a number of layered, offset plies. The offset plies have generally the same effect as the crescent shape ply and are used to obtain the total gauge needed since some single plies having the total thickness needed would trap air at the ply edges and might localize shoulder flex points.

Other ply arrangements, for example layered plies where each successive layer is narrower than the last may be used. Other arrangements will be apparent to those skilled in the art.

It has been found that in a steel reinforced monoply tire, the gauge of floating reinforcement in the shoulder area of the uncured tire, in general, must be about twice the gauge required in such ribbon reinforcement in polyester reinforced monoply tires. Also, it has been discovered that steel reinforced monoply tires having different aspect ratios require different amounts of sidewall/crown area reinforcement. Accordingly, in a high performance steel monoply tire having an aspect ratio of 0.5 or less, the minimum gauge of gum rubber floating reinforcement is about 0.075 inch (1.905 mm), and reinforcement having a gauge 0.075 to 0.175 inch (1.905 to 4.445 mm) may be used. Those skilled in the art will recognize that if the gauge of the floating reinforcement is too thick, or the reinforcement is made too stiff, the reinforcement will hinder the flexing of the tire and may ultimately reduce the durability of the tire.

Similarly, in high performance monoply steel tires having an aspect ratio of 0.5 to 0.8, it has been found that the minimum gauge of floating reinforcement is about 0.020 inch (0.508 mm), and reinforcement having a gauge of 0.020 to 0.085 inch (0.508 to 2.159 mm) may be used. Those skilled in the art will recognize that as the aspect ratio of the tire increases, the amount of reinforcement needed in the shoulder of the tire decreases, and the lower gauge reinforcement will be used in the higher aspect ratio tires.

Referring again to FIGS. 2 and 2a, when fiber reinforcement is used, floating reinforcement ply 24 comprises fiber 32 encased in a ply rubber 34. In either case, in the illustrated embodiment, ply rubber 34 is the same rubber used in the carcass ply and has a 100% modulus of 5 to 6 N/mm$^2$, a tensile strength of 15 to 25 N/mm$^2$, preferably 18 to 25 N/mm$^2$, and an elongation at break of 300 to 450%, preferably 325 to 400%, and a tack of 0 to 5, preferably 2 to 5, and more preferably 3½ to 4.

In the illustrated embodiment, when the ply rubber was loaded with 1.5 phr aramid fiber, the ply demonstrated a 100% modulus of 7 to 8 N/mm$^2$, a tensile strength of 16 to 19 N/mm$^2$, and an elongation at break of 340 to 350%. The addition of the fiber also increases the tear strength of the rubber by 30% or more.

In illustrated embodiments of the invention, it has been found that when a floating reinforcement ply in a high performance tire is reinforced with 1 to 2 phr aramid fibers, satisfactory results are obtained when the gauge of floating reinforcement ply 24 in a tire having an aspect ratio of 0.5 to 0.8 is 0.020 to 0.060 inch (0.508 to 1.524 mm), and satisfactory results are obtained when the gauge of the floating reinforcement ply in a high performance tire having an aspect ratio less than 0.50 is 0.040 to 0.100 inch (1.016 to 2.54 mm).

The invention is further illustrated with reference to the following example.

EXAMPLE 1

In the early development of tires of the invention carcass constructions of tires size P275/40ZR17 using 0.18 mm wire at 18 epi and a 0.040" (1.016 mm) gauge floating reinforcement were tried. The data in Table 1 below shows that the tires failed the low inflation endurance test and did not meet minimum standards in the fatigue capacity test (130% for the maximum fatigue capacity and 100% for the low maximum fatigue capacity are needed to pass the test).

TABLE 1

| | Development Tires | |
|---|---|---|
| Const. | 83B | 83C |
| Wire | 1 + 5 × .18 @ 18 | 1 + 5 × .18 @ 18 |
| Floating Reinforcement | 1–.040" gum | 1–.040" gum |
| Total Ribbon GA | .040" | .040" |
| Bead | Strap | Strap |
| Plunger Residual | No | No |
| Burst Residual | No | No |
| Low INF Endurance | 2355 SWF 2925 SWF | 2920 SWF 3410 OK |

TABLE 1-continued

Development Tires

| Const. | 83B | 83C |
|---|---|---|
| Fatigue Capacity | 115/80 | 111/0 |
| SPL TRD ATE | 30,513 | 28,635 |
| (45,000 SF) | SWF | SWF |
|  | 35,000 | 31,230 |
|  | 29,609 | SWF |
|  | 35,000 | 35,000 |
|  |  | 34,669 |

SWF indicates sidewall failure.

EXAMPLE 2

Tires size P195/75R14 were constructed substantially as illustrated in FIGS. 3 and 3a using a floating reinforcement ply which was reinforced with 1.5 phr aramid pulp fiber oriented in the circumferential direction of the tire. The floating reinforcement strip had a gauge of 0.040 inch (1.016 mm) and was 63.5 mm wide.

Tires were constructed using various combinations of carcass reinforcement, beads and floating reinforcement plies. For example, the tire showing the best properties was made using 1+5×0.16 mm steel cord reinforcement at 24 ends per inch as carcass ply (monoply) reinforcement and a Hex 3-4-3-2 bead made with 0.050 inch (1.27 mm) diameter wire. A comparison tire was made using 1+5×0.18 mm steel cords at 18 ends per inch as monoply reinforcement and a 4×5 strap bead made with 0.038 inch (0.965 mm) diameter wire, and a 0.040 inch (1.016 mm) gauge ply rubber ribbon made without reinforcement was added to the tire in place of a floating reinforcement ply. Other constructions are illustrated below.

The constructions were subjected to the fatigue capacity test (fat cap test) where in one portion of the test two tires are tested at rated loads for 100 miles (160.93 km), and 100 pounds (45.36 kg) are added to the load at 100 mile (160.93 km) intervals until the tires fail, usually between 2000 and 3000 miles (3,218.68 to 4,828.03 km). In a second portion of the test, 100 pounds (45.36 kg) is added to the load of another set of tires every 800 miles (1,287.48 km) until the tires fail.

The data on the average loads achieved in the two portions of the test are graphed, and the slope of the line between the two average loads is used to obtain a fatigue capacity rating which is used to predict the loaded durability of the tire. To pass the test, the tire must achieve a maximum load capacity of 130% of the rated load and a low fatigue capacity of 100% of the rated load.

The tires were inflated to 35 psi (2.46 kg/cm²) and were given an initial load of 1400 pounds (635.04 kg). The test was run at 50 mph (80.47 km/hr).

The inventors have observed that the tires with the highest percentage of maximum load are the tires which otherwise have the best overall durability.

The differences in the constructions tested are summarized in Table 2, the specifics of the fatigue capacity test are set forth in Table 3, and the fatigue capacity results are summarized in Table 4.

TABLE 2

| Tire | Const. on Ply | Ribbon | Bead | Belts |
|---|---|---|---|---|
| J | 1 + 5 × .16 @ 24 epi | .020" | 4 × 5 Strap .038" Wire | Type I |
| K | 1 + 5 × .18 @ 18 epi | .020" | 4 × 5 Strap .038" Wire | Type I |
| P | 1 + 5 × .16 @ 24 epi | .020" | Hex 3-4-3 .050" Wire | Type I |
| Q | 1 + 5 × .16 @ 24 epi | .040" 1.5 Flex Pulp | HEX 3-4-3 .050" Wire | Type I |
| H | 1 + 5 × .18 @ 18 epi | .040" | 4 × 5 Strap .038 Wire | Type II |
| E | 1 + 5 × .18 @ 18 epi | .040" | 4 × 5 Strap .038 Wire | Type II |
| B | 1 + 5 × .18 @ 14 epi | .040" | 4 × 5 Strap .038" Wire | Type I |
| C | 1 + 5 × .18 @ 14 epi | .040" | 4 × 5 Strap .038" Wire | Type I |
| G | 1 × .18 @ 80 epi | .020" | 4 × 5 Strap .038" Wire | Type I |
| F | 1 + 5 × .18 @ 18 epi | .020" | 4 × 5 Strap .038" Wire | Type I |

Type I belts are made with 2+2×0.25 mm steel cord @20 epi and Type II belts are made with 2×0.30 mm steel cords @24 epi.

TABLE 3

| | | Loading | Failure | | Removal |
|---|---|---|---|---|---|
| Const. | Dash | lbs/mi | Mileage | Load | Mode |
| J | 5 | 100/100 | 2773 | 4100 | Sidewall Failure |
|  | 6 | 100/100 | 2773 | 4100 | Sidewall Failure |
|  | 8 | 100/800 | 12200 | 2900 | Sidewall Failure |
|  | 7 | 100/800 | 11462 | 2800 | Sidewall Failure |
| K | 2 | 100/100 | 2200 | 3500 | Bead Failure |
|  | 3 | 100/100 | 2200 | 3500 | Bead Failure |
|  | 5 | 100/800 | 11200 | 2700 | Bead Failure |
|  | 4 | 100/800 | 11200 | 2700 | Sidewall Failure |
| P | 1 | 100/100 | 2626 | 4000 | Sidewall Failure |
|  | 4 | 100/100 | 2417 | 3800 | Sidewall Failure |
|  | 6 | 100/800 | 10499 | 3700 | Sidewall Failure |
|  | 7 | 100/800 | 10869 | 2700 | Sidewall Failure |
| Q | 4 | 100/100 | 2200 | 3500 | Bead Failure |
|  | 5 | 200/100 | 2200 | 3500 | Bead Failure |
|  | 6 | 100/800 | 12649 | 2900 | Sidewall Failure |
|  | 7 | 100/800 | 13406 | 3000 | Bead Failure |
| E | 3 | 100/100 | 2700 | 4000 | Chunking in Tread Area |
|  | 4 | 100/100 | 2700 | 4000 | Crown Failure |
|  | 16 | 100/800 | 11600 | 2800 | Sidewall Failure |
|  | 25 | 100/800 | 12075 | 2900 | Chunking in Tread Area |
| F | 2 | 100/100 | 2300 | 3600 | Crown Failure |
|  | 1 | 100/100 | 2300 | 3600 | Chunking in Tread Area |
|  | 4 | 100/800 | 10400 | 2600 | Crown Failure |
|  | 5 | 100/800 | 10725 | 2700 | Crown Failure |
| G | 3 | 100/100 | 2800 | 4100 | Chunking in Tread Area |
|  | 4 | 100/100 | 2800 | 4100 | Crown Failure |
|  | 8 | 100/800 | 13100 | 3000 | Chunking in Tread Area |
|  | 12 | 100/800 | 13400 | 3000 | Crown Failure |
| H | 1 | 100/100 | 2800 | 4100 | Sidewall Failure |
|  | 5 | 100/100 | 2650 | 4000 | Crown Failure |
|  | 6 | 100/800 | 13025 | 3000 | Sidewall Failure |
| B | 9 | 100/100 | 2200 | 3500 | Crown Failure |
|  | 8 | 100/100 | 2250 | 3600 | Crown Failure |
|  | 11 | 100/800 | 9150 | 2500 | Crown Failure |
|  | 10 | 100/800 | 9125 | 2500 | Crown Failure |
| C | 28 | 100/100 | 2200 | 3500 | Crown Failure |
|  | 29 | 100/100 | 2400 | 3700 | Crown Failure |
|  | 30 | 100/800 | 10125 | 2600 | Bead Failure |
|  | 31 | 100/800 | 10600 | 2700 | Chunking in Tread Area |

TABLE 4

| Const. | Fat Cap | 90% Limits | Line Slope | Fat Cap % Max Load | Low Fat Cap % Max Load |
|---|---|---|---|---|---|
| E | 2221 | +−179 | 1779 | 159 | 146 |
| F | 2130 | +−179 | 1470 | 152 | 139 |
| G | 2398 | +−0 | 1703 | 171 | 171 |
| H | 2348 | +−253 | 1703 | 168 | 150 |
| B | 1926 | +−179 | 1624 | 138 | 125 |
| C | 2130 | +−400 | 1470 | 152 | 124 |
| J | 2166 | +−179 | 1934 | 155 | 142 |
| K | 2262 | +−0 | 1238 | 162 | 162 |
| P | 2044 | +−358 | 1856 | 146 | 120 |
| Q | 2649 | +−179 | 851 | 189 | 176 |

EXAMPLE 3

Size P275/40ZR17 tires were made with steel reinforced mono carcass plies. As in the higher aspect ratio tires of example 2, different wire reinforement and different bead wires were used in different constructions. Wire designated "A" in the constructions refers to 1+5×0.16 mm wire @28 epi in a carcass having a 0.052" (1.3208 mm) treatment gauge. "B" wires in the constructions refers to 1+5×0.18 mm wire @22 epi in the carcass with 0.055 inch (1.397 mm) treatment gauge. The constructions and the results of low inflation endurance tests are provided in Table 5 and the results are summarized in Table 6.

In Table 5, the floating reinforcement ply is defined by the number of plies used and the gauge of each ply. For example "2–0.040" means two 0.040" (1.016 mm) gauge offset plies were used. "EMT-INS" means a crescent shaped insert was used in the shoulder region, i.e. the plies were tapered on both edges. The same ply rubber was used for all the floating plies, including the fabric ply (ply) and the fiber loaded ply (Pulp).

In the low inflation endurance test, tires are inflated to 15 psi (1.05 kg/cm$^2$) and run at 55 mph (88 km/h) for 3410 miles (5,487.86 km). In the test the tire is run for 4 hours at 88% of rated load, 6 hours at rated load, 21 hours at 108% of rated load and 31 hours at 115% of rated load. At the end of the test the tire passes if it survives.

The plunger test is a DOT test requirement on a new tire. The burst test, where water is pumped into the tire under pressure until the tire breaks, is a Goodyear test used to evaluate the residual strength of a tire after passing the low inflation endurance test.

In the Accelerated Treadwear and Endurance test (ATE), tires are mounted on a vehicle and the front tires are inflated to 26 psi (1.83 kg/cm$^2$) and loaded to 100% rated load, and the rear tires are inflated to 35 psi (2.46 kg/cm$^2$) and loaded to 110% rated load. The tires are run on Texas highways that are laid out to comprise 3% gravel (golf ball size but sharp), 37% secondary roads, and 60% interstate highways at 65 mph (104 km/hr). To pass the test, the average survival of the tires must be at least 30,000 miles (48,280.32 km). Goodyear's internal criteria is that they must average 45,000 miles (72,420.48 km).

In the tables, the data shows that both B constructions and both H constructions failed, which suggests that the construction is inherently flawed. The 'B' construction used a fabric ply floating reinforcement which suggests that if the floating reinforcement ply is too stiff, it contributes to the destruction of the tire. The 'H' construction used 0.040 inch (1.016 mm) gauge gum rubber as the floating reinforcement ply, which suggests that 0.040 inch (1.016 mm) gum rubber with B wire reinforcement does not provide enough reinforcement.

The 'F' and 'J' constructions are made with 'A' wire reinforcement and a 0.040 inch (1.016 mm) gum floating reinforcement ply, and since some of the tires survived, this suggests that 0.040 inch (1.016 mm) gum floating reinforcement may be sufficient reinforcement in some low aspect ratio tire constructions. The successful tire constructions all used at least 0.080 inch (2.032 mm) gum rubber, or 0.080 pulp reinforced rubber. In view of the fact that some tires survived with 0.040 inch (1.016 mm) gum reinforcement, it is believed that 0.040 pulp reinforced floating reinforcement plies will provide sufficient reinforcement in the shoulder region on these tires.

Table 6 summarizes the results for the constructions tested.

TABLE 5

P275/40ZR17 EF1
Steel Ply

| Const. | 41A | 41B | 41C | 41D | 41E | 41F | 41G | 41H | H1J | 41L | 41K |
|---|---|---|---|---|---|---|---|---|---|---|---|
| Wire | A | A | A | A | A | A | B | B | A | A | B |
| Floating Reinforcement | 2.040" Pulp | 2-80D Ply | EMT INS | EMT INS | 2-.040" | 1-.040" | 2-.040" | 1-.040" | 1-.040" | 2-.040" | 2-.040" |
| Total Ribbon GA | 0.08" | .084" | .080" | .080" | .080" | 0.040" | .080" | .040" | .040" | .080" | .080" |
| Bead | HEX | HEX | HEX | PYRMD | HEX | HEX | HEX | HEX | HEX | Hex | HEX |
| Plunger Residual | 4216 | NO | 5080 | 5455 | 5285 | 5181 | 4960 | NO | 5069 | 4216 | 4824 |
| Burst Residual | 476 CRN | NO | 490 CRN | 481 CRN | 330 CRN | NO | 335 CRN | NO | NO | 376 CRN | 345 CRN |
| Low INF Endurance | 3410 OK 3410 OK | 3085 SWF 3146 SWF | 3410 OK 3410 OK | 3410 OK 3410 OK | 3410 OK 3410 OK | 1165 SWF 3410 OK | 3410 OK 3410 OK | 3056 SWF 3410 SWF | 3130 SWF 3410 OK | 3410 OK 3410 OK | 3410 OK 3410 OK |
| Fatigue Capacity | | | | | | | | | | 163/ 135 | 179/ 114 |
| SPL TRD ATE (45,000 SF) | | | | | | | | | | 15K Run | 45K Run |

TABLE 6

| | # Build | # Pass | Percentage |
|---|---|---|---|
| 2 Pulp .080 41A | 1 | 1 | 100% |
| 2 FAB .088 | 1 | 0 | Zero |

TABLE 6-continued

|  | # Build | # Pass | Percentage |
|---|---|---|---|
| 41B |  |  | Terrible |
| 2 GUM .080 41E, G, K | 3 | 3 | 100% |
| 1 EMT .080 41C, D | 2 | 2 | 100% |
| 1 GUM .040 41F, H, J | 3 | 0 | Zero (close) |

The embodiments of the invention described above should be considered as illustrative and not as limiting the scope of the invention as defined in the following claims.

What is claimed is:

1. A high performance pneumatic tire (10) comprising a pair of substantially parallel annular beads (14), a single radial ply carcass (12) wrapped around said beads (14), a tread (20) disposed radially outwardly of the crown region (28) of the carcass (12), sidewalls (22) disposed between said tread (20) and said beads (14), a belt assembly (16) including at least one belt ply interposed between the tread portion and the crown region (28) in circumferential surrounding relation to the carcass (12), the at least one belt ply comprising reinforcement cords extending parallel to one another, and said carcass ply (12) is made with steel reinforcement cords and a floating reinforcement ply (24) bridges a crown portion (28) and a sidewall portion (26) of the carcass (12) radially inward of said carcass ply (12), wherein said floating reinforcement ply (24) is selected from the group consisting of
 (a) gum rubber having a 100% modulus of 5–6 N/mm$^2$ and a gauge of 0.075 to 0.175 inch (1.905 to 4.445 mm) when said tire has an aspect ratio of less than 0.5, and
 (a1) a gauge of 0.02 to 0.085 inch (0.508 to 2.159 mm) when said tire has an aspect ratio of 0.5 to 0.8, and
 (b) short fiber reinforced gum rubber, wherein the short fiber reinforcement comprises 1–2 parts fiber per hundred parts rubber having a 100% modulus of 7–8 N/mm$^2$ and a gauge of 0.02 to 0.06 inch (0.508 to 1.524 mm) when the aspect ratio of the tire is 0.5 to 0.8, and
 (b1) a gauge of 0.04 to 0.10 inch (1.01 to 2.54 mm) when the aspect of the tire is less than 0.5,
and wherein gum rubber in said floating reinforcement ply (24) contains natural rubber and has a tensile strength of 15 to 25 N/mm$^2$ and an elongation at break of 300 to 450%.

2. The pneumatic tire of claim 1 wherein the reinforcing fibers are selected from the group consisting of polyamides, polyalkylenes, polyesters, cellulosics, inorganic fibers, aromatic polyamides and mixtures thereof.

3. The pneumatic tire of claim 2 wherein reinforcing fibers in said reinforcement are selected from the group consisting of nylon, polyethylene terephthalate, polyethylene napthalate, aramid, glass, metal, rayon, polyethylene, polypropylene, cotton and mixtures thereof.

4. A high performance pneumatic tire comprising a single radial ply carcass (12), a tread (20) disposed radially outwardly of a crown region (28) of the carcass (12), a belt assembly (16) having an overall width substantially equal to that of the tread (20) interposed between the tread portion (12) and the crown region (28) in circumferential surrounding relation to the carcass (12), whereby the belt assembly (16) includes a first radially innermost belt ply and a second radially outermost belt ply, each belt ply having reinforcement cords extending parallel to one another and reinforcement cords in each belt ply having opposite cord angle orientation compared to the other, and wherein said angle is 15° to 35° with respect to the equatorial plane of the tire (10), said tire having an aspect ratio of 0.8 or less, wherein carcass reinforcement cords are made of steel and a floating reinforcement ply (24) comprising fiber reinforced elastomeric material is located radially inward of the carcass ply (12) and bridging a crown (28) and a sidewall portion (26) of the carcass (12) and said floating reinforcing ply (24) is loaded with 1.5 phr aramid fibers and said floating reinforcing ply has a 100% modulus of 7 to 8 N/mm$^2$, a tensile strength of 16 to 19 N/mm$^2$, and an elongation at break of 340 to 350%, said floating reinforcement ply having a gauge of 0.02 to 0.06 inch (0.508 to 1.524 mm) when the aspect ratio of the tire is 0.5 to 0.8, and a gauge of 0.04 to 0.10 inch (1.01 to 2.54 mm) when the aspect ratio of the tire is less than 0.5.

5. The tire of claim 4 wherein said carcass ply (12) is reinforced with 1+5×0.16 mm @11 epc (@28 epi) steel cords.

6. The tire of claim 4 wherein said carcass ply (12) is reinforced with 1+5×0.18 mm @8.7 epc (@22 epi) steel cords.

* * * * *